Jan. 12, 1971   B. W. SORENSON   3,554,585
LOCKING DEVICE FOR GYMNASTIC APPARATUS OR THE LIKE
Filed Aug. 20, 1968
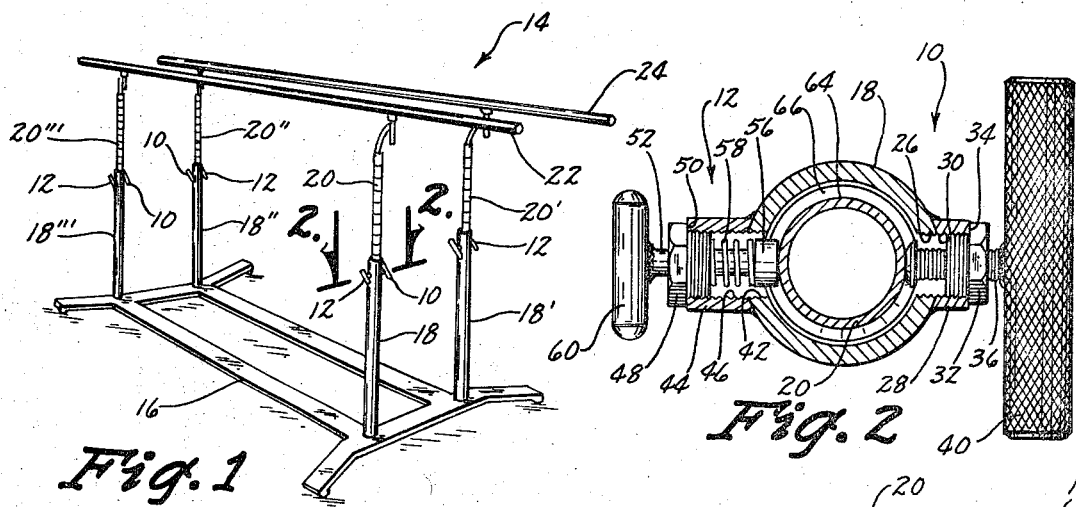
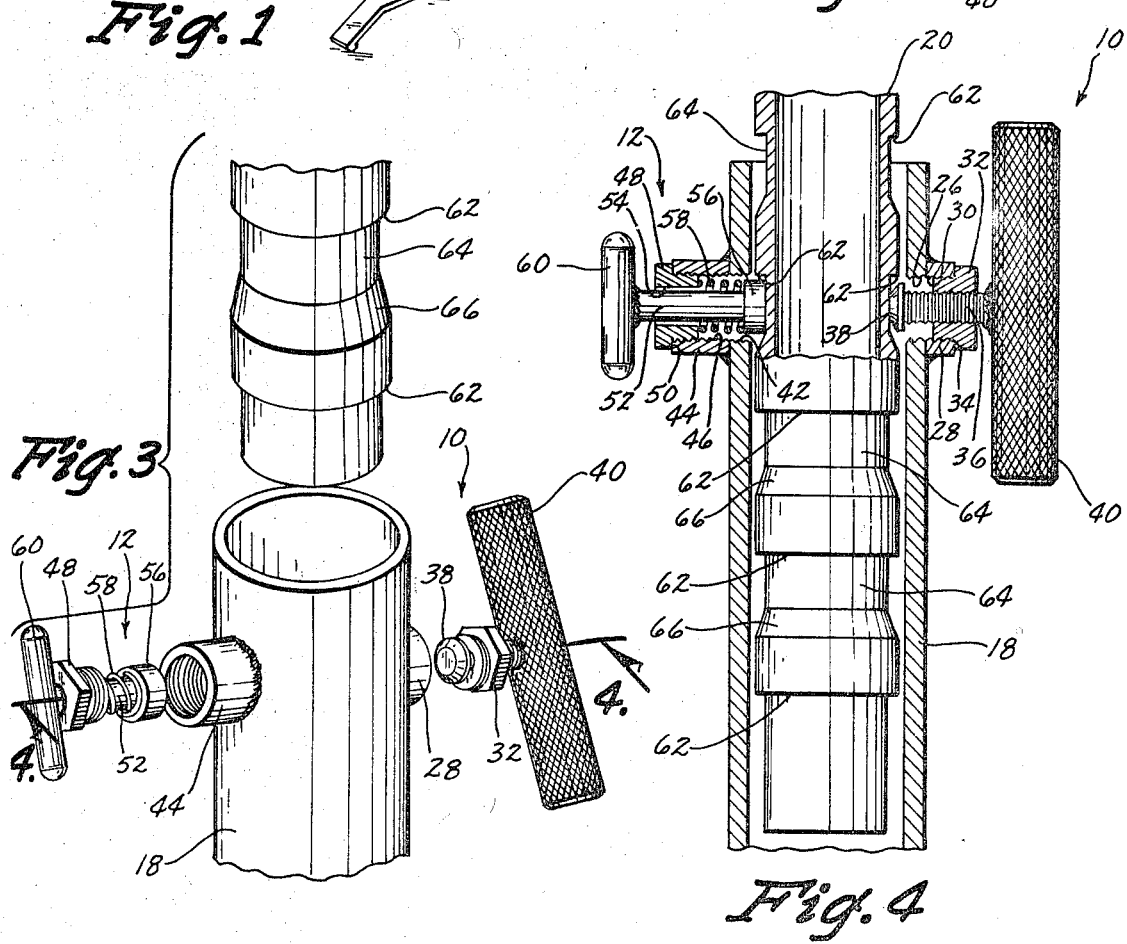
INVENTOR
BILL W. SORENSON
BY
Zarley, McKee & Thomte
ATTORNEYS

# United States Patent Office 3,554,585
Patented Jan. 12, 1971

3,554,585
LOCKING DEVICE FOR GYMNASTIC APPARATUS OR THE LIKE
Bill W. Sorenson, Jefferson, Iowa, assignor to American Athletic Equipment Co., Jefferson, Iowa, a corporation of Iowa
Filed Aug. 20, 1968, Ser. No. 753,993
Int. Cl. F16b 7/14
U.S. Cl. 287—58        3 Claims

ABSTRACT OF THE DISCLOSURE

A locking device for gymnastic apparatus or the like adapted to selectively lock telescoping members in various positions of their slidable movement. One of the telescoping members is a hollow tubular member which slidably receives a cylindrical member having a plurality of spaced apart shoulders formed therein. The tubular member has an opening formed in its wall portion and has a bored support rigidly secured thereto which registers with the opening. A bushing is threadably secured to the bored support and has an elongated shaft movably extending therethrough, the inner end of which is adapted to engage one of the shoulders to limit the relative movement of the telescoping members. The shaft may be completely removed from the apparatus by threadably removing the bushing from the bored support.

---

The interconnection of telescoping tube members is important in the gymnastic apparatus field to adjust and dismantle the equipment. The connection of these members must be tight and must be easily operated. Heretofore, the locking devices employed on gymnastic apparatus were of such construction that the apparatus would have to be sent to the factory when the locking device became worn or damaged. The inconvenience of sending the apparatus to the factory was the result of the manner in which the locking devices were secured to the apparatus and which prevented their removal therefrom.

Therefore, it is a principal object of this invention to provide an apparatus lock for gymnastic apparatus or the like.

A further object of this invention is to provide an apparatus lock for gymnastic apparatus or the like which is simple, safe and easy to operate.

A further object of this invention is to provide a locking device for gymnastic apparatus which is trouble-free.

A further object of this invention is to provide a locking device for gymnastic apparatus which may be removed from the apparatus for repair or replacement.

A further object of this invention is to provide a locking device for gymnastic apparatus which does not become loosened during periods of use.

A further object of this invention is to provide a locking device for gymnastic apparatus or the like which permits the interconnection of telescoping members in such a manner to adjust and dismantle the same.

A further object of this invention is to provide a locking device for gymnastic apparatus or the like which is refined in appearance, economical of manufacture and durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of a piece of gymnastic equipment utilizing the locking devices of this invention;

FIG. 2 is an enlarged sectional view as seen along lines 2—2 of FIG. 1;

FIG. 3 is a partial exploded perspective view of the locking device of this invention; and FIG. 4 is a sectional view as seen along lines 4—4 of FIG. 3 with portions thereof cut away to more fully illustrate the invention.

The locking devices of this invention are generally designated by the reference numerals 10 and 12 and may be employed on any gymnastic apparatus utilizing telescoping members such as the parallel bar apparatus 14 illustrated in FIG. 1. Apparatus 14 includes a base 16 having four upstanding tubular members 18, 18', 18", and 18'''. Pistons 20, 20', 20", and 20''' are slidably received by the tubular members 18, 18', 18", and 18''' respectively as illustrated in FIG. 1. A locking device 10 and a locking device 12 are operatively mounted on each of the tubular members to selectively lock the tubular member and its respective piston in various positions on their slidable movement. The apparatus 14 also includes a pair of parallel bars 22 and 24 secured to the upper ends of the pistons by any convenient means.

Inasmuch as each of the tubular members are identical, only tubular member 18 will be described in conjunction with its respective piston 20 and locking devices 10 and 12. Tubular member 18 is provided with an opening 26 formed therein as best illustrated in FIG. 4. An internally threaded support 28 is secured to the outer surface of tubular member 18 by welding or the like and has its internally threaded portion 30 registering with the opening 26. A bushing 32 is threadably received in the support 28 and has a shoulder 34 adapted to engage the outer end of the support 28 to limit the inward movement of the bushing 32. A threaded shaft 36 threadably extends through the bushing 32 and has a tapered inner end 38 which is adapted to extend through the opening 26 and internally threaded portion 30 of support 28. A solid cylindrical handle 40 is secured to the outer end of shaft 36 by welding or the like and is disposed at right angles to the longitudinal axis of the shaft 36 as illustrated in FIG. 4.

Tubular member 18 is also provided with an opening 42 formed therein which may be located at any relative position with respect to the opening 26. The drawings illustrate the openings 26 and 42 as being disposed directly opposite each other but this relationship is not critical since the openings could be spaced in different vertical planes as well as different angular relationships than illustrated in the drawings. A support 44 is secured to the outer surface of tubular member 18 by welding or the like and has an internally threaded portion 46 registering with the opening 42. A bushing 48 is threadably secured to the support 44 and has a shoulder 50 adapted to engage the outer end of the support 44 to limit the inward movement of the bushing 48 with respect to the support 44. An elongated shaft 52 slidably extends through an opening 54 in bushing 48 and has a head portion 56 provided at its inner end. Spring means 58 embraces the inner end of the shaft 52 between head portion 56 and bushing 48 to yieldably bias the shaft 52 inwardly through the opening 42. A solid handle 60 is secured to the outer end of shaft 52 by welding or the like and is disposed at a right angle with respect to the longitudinal axis of the shaft 52. As seen in FIG. 4, the diameters of opening 42 and internally threaded portion 46 is greater than the diameter of head portion 56 to permit the head portion 56 to pass therethrough. Likewise, the head portion 38 on locking device 10 has a diameter which is less than the diameter of opening 26 and the internally threaded portion 30 to permit its movement therethrough. Piston 20 is provided with a plurality of vertically spaced shoulders 62 formed therein. Piston 20 is also provided with grooves 64 and tapered portions 66 as illustrated in FIG. 4.

In operation, the piston 20 may be raised with respect to the tubular member 18 by threadably loosening shaft 36 to cause the end portion 38 to move out of engagement with the groove 64 and shoulder 62. The tapered portions 66 permit the piston to be simply pulled upward to raise the equipment since the head portion 56 of locking device 12 automatically engages each groove as the piston 20 is moved upwardly. When the desired piston height is reached, the spring means 58 maintains the head portion 56 in the nearest groove on the piston and holds the piston safely, even under a heavy weight, until the locking device 10 is tightened for use. When it is desired to lower the piston 20 with respect to the tubular member 18, it is simply necessary to loosen the locking device 10 and pull out the shaft 52 so that the head portion 56 is moved out of the groove 64. The apparatus is then lowered to the desired height and the shaft 52 is released to permit the spring means to force the head portion 56 inwardly into the interior of tubular member 18 and into engagement with the nearest groove 64. The locking device 10 is then tightened and such tightening positively prevents the relative movement of piston 20 with respect to tubular member 18.

If the locking device 10 becomes worn or damaged, it is simply necessary to remove the same by threadably removing bushing 32 from the support 28. The shaft 36, handle 40 and bushing 32 may then become completely removed from the apparatus and a substitute unit replaced on the apparatus. The locking device 12 may also be easily removed by simply threadably removing bushing 48 from the support 44. Thus it can be seen that the locking device may be quickly and easily removed and replaced without the necessity of sending the entire unit to the factory should the same become worn or damaged. The locking devices disclosed herein also positively insure that the telescoping members will be locked into place to prevent the relative slidable movement therebetween. The solid construction of the handle 40 also prevents the shaft 36 from becoming loosened during periods that the apparatus is used. If handle 40 were of tubular construction, the shaft 36 would tend to become loose which could create a serious safety hazard during the time that the apparatus is being used.

Thus it can be seen that the device accomplishes at least all of its stated objectives.

Some changes may be made in the construction and arrangement of my locking device for gymnastic apparatus or the like without departing from the real spirit and purpose of my invention, and it is my intention to cover by my claims, any modified forms of structure or use of mechanical equivalents which may be reasonably included within their scope.

I claim:

1. In combination,
   a gymnastic apparatus comprising at least one hollow tubular member with a cylindrical member telescopically extending into said tubular member,
   said cylindrical member having a plurality of vertically spaced shoulders formed therein,
   a first internally threaded member rigidly secured to said tubular member,
   a first bushing threadably mounted in said first internally threaded member, said first bushing having an internally threaded bore formed therein,
   said tubular member having a first opening formed therein which registers with the bore of said bushing,
   a first shaft threadably mounted in said bushing extending through the opening in said tubular member,
   said first shaft having an inner end adapted to engage said cylindrical member between two of said vertically spaced shoulders when said shaft is threadably moved inwardly through said bushing and said opening in said tubular member,
   said first shaft having an elongated handle of solid metal construction rigidly secured to the outer end thereof, said handle being transverse to the longitudinal axis of said shaft and being secured intermediate its length thereto,
   a second internally threaded member secured to said tubular member in spaced relationship with respect to said first internally threaded member,
   a second bushing threadably mounted in said second internally threaded member,
   a spring loaded shaft extending through said second bushing and extending inwardly through an opening in said tubular member, said spring loaded shaft having an inner end normally adapted to engage one of said shoulders to limit the movement of said cylindrical member with respect to said tubular member, said spring loaded shaft having a handle means secured to its outer end.

2. The structure of claim 1 wherein said inner end of said first shaft has a diameter which is less than the diameter of said first opening in said tubular member, and the diameter of said first internally threaded member.

3. The structure of claim 1 wherein the inner ends of said shafts have a diameter which is less than the diameters of said first and second openings in said tubular member and the diameters of said first and second internally threaded members.

References Cited

UNITED STATES PATENTS

| 428,542 | 5/1890 | Wright | 287—58CT |
| 561,880 | 6/1896 | Fuerstenberg | 248—413 |
| 866,184 | 9/1907 | Brison | 287—52.08X |
| 1,481,445 | 1/1924 | Swanson | 248—413X |
| 1,731,461 | 10/1929 | Hansen | 248—408 |
| 1,848,338 | 3/1932 | Garrow | 248—408X |
| 2,536,503 | 1/1951 | Jones | 248—413 |
| 2,659,413 | 11/1953 | Cramer | 248—408X |
| 3,211,482 | 10/1965 | Sorenson | 285—303X |
| 3,390,855 | 7/1968 | Solin | 248—408X |

DAVID J. WILLIAMOWSKY, Primary Examiner

A. V. KUNDRAT, Assistant Examiner

U.S. Cl. X.R.

248—408